United States Patent [19]

Mumallah

[11] Patent Number: 4,917,186

[45] Date of Patent: Apr. 17, 1990

[54] ALTERING SUBTERRANEAN FORMATION PERMEABILITY

[75] Inventor: Naim A. Mumallah, Bartlesville, Okla.

[73] Assignee: Phillips Petroleum Company, Bartlesville, Okla.

[21] Appl. No.: 310,930

[22] Filed: Feb. 16, 1989

[51] Int. Cl.$^4$ .................. E21B 33/138; E21B 43/22
[52] U.S. Cl. .................. 166/295; 166/270; 166/273; 166/300
[58] Field of Search .............. 166/270, 273, 274, 294, 166/295, 300; 523/130

[56] References Cited

U.S. PATENT DOCUMENTS

| | | | |
|---|---|---|---|
| 3,371,712 | 3/1968 | Adams. | |
| 3,762,476 | 10/1973 | Gall | 166/294 |
| 3,794,115 | 2/1974 | Skagerberg | 166/294 |
| 3,978,928 | 9/1976 | Clampitt | 166/294 |
| 4,193,453 | 3/1980 | Golinkin | 166/295 |
| 4,524,828 | 6/1985 | Sabins et al. | 166/295 X |
| 4,552,217 | 11/1985 | Wu et al. | 166/270 |
| 4,569,393 | 2/1986 | Bruning et al. | 166/270 |
| 4,579,667 | 4/1986 | Echt et al. | 166/274 X |
| 4,683,949 | 8/1987 | Sydansk et al. | 166/270 |
| 4,799,548 | 1/1989 | Mumallah et al. | 166/288 |

*Primary Examiner*—George A. Suchfield
*Attorney, Agent, or Firm*—Laney, Dougherty, Hessin & Beavers

[57] ABSTRACT

Methods and compositions for altering the water permeability of subterranean formations are provided. The compositions are comprised of water, at least one polymer capable of being gelled when contacted with a crosslinking agent, at least one crosslinking agent comprised of polyvalent metal cation, and a cation reactivity retarding chelating agent which provides anion for chelating the polyvalent metal cation selected from substantially water soluble dicarboxylic acids, hydroxy carboxylic acids, ketocarboxylic acids and the corresponding salts thereof.

18 Claims, No Drawings

ALTERING SUBTERRANEAN FORMATION PERMEABILITY

BACKGROUND OF THE INVENTION

1. Field of the Invention

The present invention relates generally to methods and compositions for altering the permeability of subterranean formations, and more particularly, to methods and compositions for forming in situ gels in water producing and/or waterflooded subterranean formations.

2. Description of the Prior Art

Undesirable water recovered from oil wells can result from the infiltration of naturally occurring subterranean water or, in the case of waterflooding operations, from the injected drive water. In both cases, water flows through zones of high permeability to the producing well bores whereby oil in less permeable zones is bypassed.

In waterflooding operations, the more permeable zones of subterranean formations tend to take most of the injected flood water. While this is acceptable initially when the oil contained in the high permeability zones is being swept therefrom, it subsequently becomes undesirable as the oil in such zones becomes depleted. From that point on, the water-flood provides little benefit in enhancing oil production.

Methods and compositions for accomplishing near well and in depth plugging of high permeability zones by forming gels therein have heretofore been developed and used. The formation of the gels causes high permeability zones to be plugged or at least lowered in permeability whereby subsequently injected flood water is caused to enter previously bypassed zones. This in turn causes the flood water to mobilize increased amounts of oil which are recovered from the subterranean formation.

A variety of methods and polymer compositions which gel in situ to reduce the permeability of high permeability zones in subterranean formations have been utilized successfully. U.S. Pat. No. 3,762,476 issued on Oct. 2, 1973 discloses a method of reducing recovered water from a subterranean formation wherein aqueous polymer solutions interspaced with aqueous solutions of crosslinking metallic ions are injected into the formation. A variety of polymers can be utilized in conjunction with various multivalent metal cations complexed with sequestering agents selected from acetate, nitrilotriacetate, tartrate, citrate and phosphate. The solution containing the crosslinking complex is injected after the first polymer solution injection, followed by injection of further polymer solution, which sequence can be repeated.

U.S. Pat. No. 4,569,393 issued on Feb. 11, 1986 discloses a water permeability correction process to improve the sweep efficiency of waterflooding which involves the sequential injection of a solution containing a sequestered polyvalent metal cation, such as aluminum citrate, and a polymer solution containing a gelable polymer, such as polyacrylamide, followed by the injection of carbon dioxide to decrease the pH of the polymer which activates the delayed in situ gelation thereof. The field applications of this method and the method described in U.S. Pat. No. 3,762,476 are restricted to fields having an available fresh water supply because the crosslinking metal ion complexes and/or the gelation activator are incompatible with hard brines.

U.S. Pat. No. 4,552,217 issued on Nov. 12, 1985 discloses a water permeability correction process to improve the sweep efficiency of waterflooding which involves the sequential injection of an aqueous solution containing polyvalent metal cations sequestered with biocidal anionic sequesterants, and an aqueous solution containing a gelable polymer such as polyacrylamide.

U.S. Pat. No. 4,683,949 issued on Aug. 4, 1987 describes a conformance improvement method using a gel comprised of a polyacrylamide polymer and a chromium (III) acetate gelling agent capable of crosslinking the polymer in an aqueous solvent. While the above-described methods and compositions as well as other methods and compositions have been utilized successfully for improving the sweep efficiency of waterflooding and/or reducing the production of naturally occurring formation waters, such methods and compositions have generally been unsuccessful in applications requiring the formation of gels deep in high permeability zones having high temperatures, i.e., temperatures above about 160° F. At such temperatures, the heretofore used crosslinking metal cation complexes break down whereby the cation is reacted and/or lost prior to penetrating into the formation to the in-depth location required.

U.S. Pat. No. 4,799,548 issued on Jan. 24, 1989 discloses two crosslinkers with differing temperature responsive crosslinking characteristics which are used to gel water soluble polymers for the purpose of diverting steam in steam stimulation operations carried out in heavy crude oil wells. The high temperature activated crosslinking agents disclosed are comprised of combinations of phenolic compounds and aldehydes and are generally suitable for altering the water permeability of subterranean formations having temperatures of 210° F. or above.

Thus, there is a need for methods and compositions for altering subterranean formation permeability which can be effectively utilized at temperatures in the range of from about 160° F. to 210° F.

SUMMARY OF THE INVENTION

By the present invention, methods and compositions for altering the permeability of subterranean formations are provided which fulfill the above-described need, i.e., the methods and compositions are effective in forming gels and reducing permeability in formations having temperatures in the range of from about 160° F. to about 210° F. at locations therein long distances from the composition injection points.

The compositions of this invention are comprised of water, at least one polymer capable of being gelled when contacted with a crosslinking agent, at least one crosslinking agent comprised of polyvalent metal cation, and a chelating agent which retards the activity of the polyvalent metal cation selected from the group consisting of substantially water soluble dicarboxylic acids containing from 2 to 4 carbon atoms, substantially water soluble di- and polycarboxylic acids containing from 3 to 6 carbon atoms in which a hydrogen atom of the alpha or beta carbon atom is replaced by a hydroxyl group, substantially water soluble alpha and beta ketocarboxylic acids containing from 2 to 4 carbon atoms, the corresponding water soluble salts of such acids, and mixtures of such acids and salts. The chelating agent forms a complex with the polyvalent metal cation which is soluble and stable in aqueous solutions including hard brines at temperatures up to about 210° F.

Particularly preferred chelated crosslinking metal complexes of the present invention which are stable in aqueous solutions at temperatures up to about 210° F. are comprised of polyvalent metal cations chelated with anions selected from malonate and oxalate. The most preferred polyvalent metal cation is chromium (III) cation.

The methods of the invention for altering the water permeability of a subterranean formation comprise injecting a composition into the formation which forms a gel therein, the composition being comprised of water, at least one polymer capable of being gelled when contacted with a crosslinking agent, at least one crosslinking agent comprised of polyvalent metal cation, and a cation reactivity retarding chelating agent of the type described above for sequestering the polyvalent metal cation. The method can be carried out by injecting a single aqueous solution comprised of the above components, or the polymer and chelated crosslinking metal cation complex can be injected sequentially. That is, an aqueous solution or dispersion of polymers can be injected first, followed by an aqueous solution of the chelated crosslinking polyvalent metal cation complex followed by additional aqueous solution or dispersion of polymers, which sequence can be repeated.

It is, therefore, a general object of the present invention to provide methods and compositions for altering subterranean formation permeability.

A further object of the present invention is the provision of methods and compositions for altering both near well and in depth permeability in subterranean formations having temperatures up to about 210° F.

It is a further object of the present invention to provide chelated complexes of metallic cations which have stability in aqueous solutions at temperatures up to about 210° F.

Other and further objects, features and advantages of the present invention will be readily apparent to those skilled in the art upon a reading of the description of preferred embodiments which follows.

DESCRIPTION OF PREFERRED EMBODIMENTS

By the present invention, delayed gelable compositions for altering the permeability of subterranean formations are provided. The compositions can be formed using any readily available water including oilfield brines and seawater, and can be utilized to form gels at locations in deep hot (up to about 210° F.) subterranean formations which are long distances from the points of injection of the compositions.

Methods are provided which employ the compositions for altering both near well and in depth subterranean formation permeability. In near well applications, a single aqueous composition containing effective amounts of a gelable polymer and a crosslinking agent complex comprised of polyvalent metal cation and chelating anion can be injected into the formation. In the in depth alteration of subterranean formation permeability, a sequential injection method is preferably utilized. Such method involves the injection of an effective volume of an aqueous solution containing the polymer to be gelled, followed by an effective volume of aqueous solution containing the crosslinking agent complex, followed by a second volume of aqueous solution containing additional polymer to be gelled. Such sequential injection can be preceded by the injection of a preflush solution and followed by the injection of a volume of water effective to move the sequential injection to a desired location in the formation being treated.

The delayed gelable compositions of this invention for altering the water permeability of subterranean formations are comprised of water, at least one polymer capable of being gelled when contacted with a crosslinking agent, at least one crosslinking agent comprised of polyvalent metal cation, and a chelating agent which provides anion for sequestering the polyvalent metal cation selected from the group consisting of substantially water soluble dicarboxylic acids containing from 2 to 4 carbon atoms, substantially water soluble di- and polycarboxylic acids containing from 3 to 6 carbon atoms in which a hydrogen atom of the alpha or beta carbon atom is replaced by a hydroxyl group, substantially water soluble alpha and beta ketocarboxylic acids containing from 2 to 4 carbon atoms, the corresponding water soluble salts of the acids, and mixtures of the acids and salts.

A variety of polymers capable of being gelled when contacted with polyvalent metal cation can be utilized. Preferred polymers which are water soluble or dispersible are those containing a monomer with an amide functional group. Such a monomer can be expressed by the formula

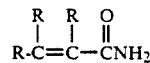

where each R is selected from a hydrogen and an alkyl group having from 1 to 3 carbon atoms.

Suitable polymers which include the above-described monomer are homopolymers of such monomers, and copolymers of such a monomer with any ethylenically unsaturated monomer from the group consisting of acrylic acid, methacrylic acid, vinylsulfonic acid, vinylbenzylsulfonic acid, vinyl acetate, acrylonitrile, methyl acrylonitrile, vinyl alkyl ether, vinyl chloride, maleic anhydride, vinyl substituted cationic quaternary ammonium compounds, 2-acrylamido-2-methyl propane sulfonic acid, sodium 2-acrylamido-2-methylpropane sulfonate, and vinyl pyrrolidone.

Particularly preferred polymers for use in accordance with the present invention can be selected from the group consisting of homopolymers of acrylamide, copolymers of acrylamide and vinyl pyrrolidone, homopolymers of methacrylamide, copolymers of acrylamide and methacrylamide, copolymers of acrylamide and acrylic acid, copolymers of methacrylamide and acrylic acid, terpolymers of vinyl pyrrolidone, acrylamide, and sodium 2-acrylamido-2-methylpropane sulfonate, and copolymers of acrylamide and sodium 2-acrylamido-2-methylpropane sulfonate.

The relative ratios of the monomers are not critical to the practice of the present invention. However, specific preferred polymers include: a 60:40 weight percent copolymer of vinyl pyrrolidone and acrylamide; a 50:50 weight percent copolymer of vinyl pyrrolidone and acrylamide; a 30:15:55 weight percent terpolymer of vinyl pyrrolidone, acrylamide, and sodium 2-acrylamido-2-methylpropane sulfonate; a 40:60 weight percent copolymer of acrylamide and sodium 2-acrylamido-2-methylpropane sulfonate; and homopolymers of acrylamide wherein not more than about 40% of the carboxyamide groups are hydrolyzed.

Other suitable but less preferred polymers include polysaccharides like cellulose ethers. Examples of such cellulose ethers include various carboxyalkyl cellulose ethers such as carboxyethyl cellulose and carboxymethyl cellulose (CMC), and mixed ethers such as carboxyalkyl hydroxyalkyl ethers. The class of polymers referred to above as polysaccharides encompasses biopolysaccharides which are biochemically produced by the action of bacteria upon sugar, starches, and similar carbohydrates.

The polymer used in the composition can take any suitable form such as gel-log (a semisolid containing about 50 to about 75 weight percent water), a powder, a solution, an inverse water-in-oil emulsion, etc.

The molecular weights of the polymers used in the present invention are not critical. It is preferred, however, that the polymer have a molecular weight of between 100,000 and 20,000,000. The upper limit of molecular weight is unimportant so long as the polymer is still water-dispersible and can be pumped into a formation.

The polymer, particularly with respect to acrylamide polymers, is present in the composition in the amount of about 0.01 to about 10 weight percent, preferably about 0.02 to about 4 weight percent. The concentration of polymer in the composition depends to some degree upon the molecular weight of the polymer. A higher molecular weight results in a higher viscosity of the resulting gel for a particular concentration of polymer.

The manner in which the polymer is polymerized is not critical to the practice of the present invention. Polymerization can be initiated by chemicals, radiation, or any other technique known to those skilled in the art.

Any suitable method can be employed for preparing the composition of the invention. Thus, any suitable mixing technique or order of addition of the components of the composition to each other can be employed. However, the polymer should be dispersed in water before contacting the polymer with the other components. The mixing order can vary with the type of polymer used.

Suitable crosslinking polyvalent metal cations are those which are effective to crosslink and gel the polymer used. Such polyvalent metal cations are preferably selected from the group of aluminum, zirconium (IV), and the metal cations of the first transition metal series, i.e., scandium, titanium, vanadium, chromium, manganese, iron, cobalt, nickel and copper. The most preferred polyvalent metal cation is chromium (III) cation.

The polyvalent metal cations are employed in the form of complexes formed with one or more chelating anions which retard the reactivity of the cations. The chelating anions utilized in accordance with the present invention, in addition to retarding the onset and rate of gelation of the polymer used, form water soluble complexes having stability in high salinity brines including hard brines at temperatures up to 210° F. The term "stability" is used herein to mean that the complex of the metallic cation and the chelating agent in an aqueous solution dissociates and releases the cation at a slow enough rate to allow the cation to be transported a long distance in a formation at a temperature up to 210° F. without prematurely reacting or otherwise becoming ineffective.

Suitable chelating agents which form the above-described complexes are those capable of forming chelated complexes with the metallic cations. As used herein a chelated complex is a compound wherein a metallic ion is complexed with a ligand having more than one functional group bonded to the metallic ion. Chelation imparts additional stability to the complex and thus raises the crosslinking activation temperature. For example the malonate complex of chromium is much more thermally stable than the acetate complex of chromium. Such chelating agents are selected from the group consisting of substantially water soluble dicarboxylic acids containing from 2 to 4 carbon atoms, substantially water soluble di- and polycarboxylic acids containing from 3 to 6 carbon atoms in which a hydrogen atom of the alpha or beta carbon atom is replaced by a hydroxyl group, substantially water soluble alpha and beta ketocarboxylic acids containing from 2 to 4 carbon atoms, the corresponding water soluble salts of the acids and mixtures of the acids and salts. Preferred dicarboxylic acids are malonic acid, oxalic acid, maleic acid and succinic acid. Preferred di- and polycarboxylic acids in which the hydrogen of the alpha or beta carbon is substituted with a hydroxyl group, i.e., alpha or beta hydroxy carboxylic acids, are tartaric acid, citric acid and maleic acid. Preferred alpha or beta ketocarboxylic acids are pyvuric acid and acetoacetic acid.

The chelating anions produced by the above-described acids and salts form the stable complexes described above, and bring about the delayed gelation of the crosslinkable polymers described. Particularly preferred such chelating anions are malonate and oxalate anions, and particularly preferred complexes are chromium (III) malonates and chromium (III) oxalates.

The dicarboxylates and ketocarboxylate complexes of the polyvalent metal cations can be formed by mixing a metal salt with a dicarboxylic or ketocarboxylic acid in an aqueous medium in suitable proportions followed by adjusting the pH of the solution with a suitable base. Sufficient chelating anions should be present to completely associate with the metal cations employed.

In forming the preferred chromium (III) malonate and chromium (III) oxalate complexes, a boiling solution of potassium dichromate can be mixed with a boiling solution of malonic or oxalic acid. The resulting solution is kept boiling until no more carbon dioxide is evolved. The solution can then be evaporated to about one-fourth the original volume and ethanol added to precipitate the resulting chromium (III) malonate or oxalate anionic complex.

The polyvalent metal complexes are most conveniently prepared in advance, and an aqueous solution, made up to a convenient concentration. Generally, the molar ratio of the chelating agent to chromium or other polyvalent metal cation varies over the broad range of from about 1:2 to about 8:1, preferably about 2:1 to about 4:1. In the case of chromium (III) malonate, a minimum of about 1 mole malonate per mole of chromium (III), more preferably about 3 moles of malonate are desirable.

In carrying out the method of the present invention for altering the near well water permeability of a subterranean formation, a delayed gelable composition is prepared and injected by way of the well bore to a desired location in the formation which is to be altered in permeability. An optional preflush can be employed to alter the composition of the connate water in the formation. The preflush is generally carried out with fresh water or brine containing a low weight percent of total dissolved solids in a volume of about 1 to 3 times the pore volume of the zone to be treated.

Generally, a quantity of gelable composition from about 100% to about 120% of the pore volume of the region to be treated is utilized. The amount of crosslinking metal cation used in the composition depends on the amount of polymer in the composition. Such amount is generally from about 0.1% by weight of polymer utilized to about 60% by weight of polymer utilized.

In the usual in depth treatment of formations which have been subjected to waterflooding, after an optional preflush, a determined volume of an aqueous solution containing polymer to be gelled is injected, followed by a determined volume of an aqueous solution containing the complexed metal cation followed by another determined volume of aqueous polymer solution. Flood water is then injected to move the solutions of polymer and complex to the in depth location required. Once located in the zone or region of a subterranean formation which is to be reduced in water permeability, the gelable composition is allowed or caused to gel.

In order to further illustrate the present invention, the following examples are given.

EXAMPLE 1

This example describes the preparation of chromium (III) malonate, i.e., tris(malonato)chromate (III) by mixing a chromium (III) salt with a dicarboxylic acid in an aqueous medium followed by adjusting the pH with a base.

2.67 grams chromium (III) chloride and 3.12 grams malonic acid were weighed and dissolved in 10 ml of Bartlesville, Okla. water in a 50-ml beaker. The resulting solution was stirred magnetically for 15 minutes to insure complete dissolution of the two reactants. 50% sodium hydroxide solution in tap water was added dropwise while vigorously stirring the solution. While adding the base, the solution was monitored visually for color change and precipitation. 3.7 ml of the sodium hydroxide were needed to bring the pH to 6.3. The resulting solution was blue and clear. The chromium content in the final solution was 3.4%. A UV-visible spectrum was run on both chromium chloride and the prepared chromium malonate complex.

The absorption maxima in the spectrum of chromium chloride were at 600 and 424 nm. These maxima shifted to 578 and 409 nm, if the dilute chromium chloride solution was left for a day at room temperature. The shift in the spectrum was accompanied by a color change from green to blue. These changes in color and absorption maxima were due to the hydrolysis of the aqua ligands around the chromium ion and the formation of hydroxyl ligands, which was the first step in the formation of chromium hydroxide. The spectrum of the malonate solution displayed absorption maxima at 570±2 and at 418±2 nm, which was in agreement with the literature values for the trismalonatochromate (III) complex. Comparing the spectrum of a chromium malonate solution with that of the chloride salt provided a means to check the conversion of the hexaaquochromium (III) to trismalonatochromate (III) complex.

Tris(malonato) chromium (III) samples were made in synthetic hard brine (South Burbank produced water [SBU]). The synthetic SBU brine was formulated to contain the same concentration of salts as the produced brine from the South Burbank oilfield, Osage County, Okla. This brine has the salt concentrations shown in Table I below.

TABLE I

| Salts Content of SBU Brine | |
|---|---|
| Salt | Concentration (gm/l) |
| NaCl | 58.44 |
| $CaCl_2.2H_2O$ | 18.73 |
| $MgCl_2.6H_2O$ | 7.44 |
| $BaCl_2$ | 1.85 |

A UV-visible spectrum was run which was found to be identical to the spectrum of the complex made in Bartlesville city water.

EXAMPLE 2

Bulk gelation studies were conducted to quickly evaluate the interaction of crosslinker complexes of this invention with water soluble polymers at different conditions. Two evaluation methods of the bulk gels were used. One method is qualitative and non-destructive. Some of the examples use this qualitative measurement herein called "gel strength", which is in terms of a percentage. Gel strength for a particular sample is obtained as follows: 20 ml of a pre-gel solution of polymer and crosslinkers are placed in a 23 mm O.D.×225 mm long ampule. The ampule is sealed under anerobic conditions and aged in the vertical position in an oven for the desired period of time at the desired temperature. After the specified time lapses, the ampule is taken out of the oven and laid horizontally on a graduated scale. If the solution spreads along the whole ampule, then the gel strength is zero and the solution did not gel. If the gel is strong and does not flow, i.e., its length is exactly the same as that of the pre-gel solution, then the gel strength is 100%. Any gel strengths in between these two extremes is calculated from the formula:

$$\frac{(AL - TL)}{AL} \times 100$$

where AL is the ampule length (225 mm) and TL is tongue length of the gel measured on the scale in mm. Tongue length is defined as the length of that portion of the gel within the horizontally disposed ampule which extends beyond the point at which the gel contacts the interior surface of the ampule around the entire circumference of the ampule, after the ampule is horizontal for 1 to 2 minutes.

The other method is more quantitative, but is destructive. Some of the examples use this semi-quantitative measurement herein called "gelation extent", which is defined as the difference between the pressure required to flow the weak gel solution through a set of four 100-mesh screens and the pressure required to flow a blank polymer solution through the same set of screens at the same flow rate as the weak gel. The blank polymer solution is a solution having the same composition as the weak gel solution with the exception that no crosslinker is added. A modified screen viscometer (MSV) apparatus is used for the measurement of the gelation extent. A detailed description of a MSV apparatus is available in the literature, "A Practical Method for the Evaluation of Weak Gels", N. A. Mumallah, Journal of Petroleum Technology, February 1987, pp. 195–202. Further modifications on MSV apparatus were made for the purpose of evaluating gelation at high temperatures.

Since the gelation studies were conducted at temperatures where polymers are susceptible to degradation, i.e., temperatures greater than 150° F., particularly in the presence of oxygen, special vessels were designed to keep the polymers and gels under anaerobic conditions and make it easy to withdraw fluids from them. The stainless steel vessels were 2.5" ID and 3.75" long. The cap of each vessel was equipped with three outlet ¼" stainless steel tubes. One of the tubes reached all the way to the bottom of the vessel for fluid withdrawal. The other two tubes ended at the inner surface of the cap. One was used to supply nitrogen to the vessel; to the other tube a pressure relief valve was attached. A glass liner was used to hold the polymer or gel solution in the vessel, so there was no contact between the solution and the stainless steel vessel. Regulating valves were connected to the nitrogen delivery and fluid withdrawal tubes.

The testing procedure consisted of purging the test solution with ultra-pure nitrogen until the oxygen content was less than 15 ppb, then charging the vessel with 80 ml of the test solution. All the foregoing was done in a glove box to maintain an oxygen-free environment. The vessel was then placed in an oven set at the desired temperature and left for the desired aging period. The vessel was then taken out and placed in the bath containing the modified screen viscometer. The nitrogen injection tube was then connected to a nitrogen source, and a small stream of nitrogen under 2–5 psi pressure admitted to the vessel in order to fill the fluid withdrawal tube with the test solution. The fluid withdrawal tube was then connected to the modified screen viscometer. The pump was turned on to deliver a constant flow rate of 8.6 ml/minute. The observed pressure when 50 ml of solution had been flowed was used to calculate the gelation extent.

The same solution preparation procedure was used for the gel strength testing method as for the above evaluation procedure. Higher concentrations of polymer are needed to make strong enough gels to be measurable with this method.

The data set forth in Table II below demonstrates how the crosslinking reaction progresses as a function of time. The polymer used in this experiment was a copolymer of acrylamide and sodium-2-acrylamido-2-methyl-1-propanesulfonate commercially available from Drilling Specialties Company. The crosslinker was a chromium malonate complex. A liter of 5000 mg/l of polymer solution was made in 5% sodium chloride brine. The solution was then divided into two portions. To one portion enough volume of a chromium malonate solution was added to bring the chromium content to 200 mg/l. To the other portion a volume of brine equivalent to the volume of crosslinker solution was added. The resulting solution of this portion constitutes the blank solution. Each of the two portions was then divided equally between six vessels. The vessels were then placed in an oven at 175° F. At the specified time a vessel containing the gel and a vessel containing the blank solution were taken out of the oven and the gelation extent determined.

TABLE II

Gelation Extent as a Function of Time Using Chromium Malonate as the Crosslinking Complex

| Time (days) at 175° F. | Gelation Extent (psi) |
|---|---|
| 1 | 0.00 |
| 3 | 0.00 |
| 7 | 0.04 |
| 10 | 0.18 |
| 14 | 0.32 |
| 17 | 0.57 |
| 21 | 1.57 |

This set of data clearly shows that the gelation reaction is slow enough so that one can blend the composition of the invention and inject as large a volume as desired over a period of several days.

An experiment was conducted to evaluate the effect of the dissociation of the chromium malonate complex on the crosslinking reaction. The polymer used was a commercially available 15% hydrolyzed polyacrylamide from Nitto Chemical Company at 5000 mg/l in a 5% sodium chloride brine. The crosslinker was chromium malonate. The chromium concentration was 200 mg/l. The gel solution was placed in ampules, and the gel strength method was used to evaluate the gelation. The ampules were placed in ovens at four different temperatures. The data presented in Table III below shows the gelation as a function of time at the four temperatures.

TABLE III

Gel Strength (%) at Various Temperatures

| Time (Days) | Gel Strength (%) | | | |
|---|---|---|---|---|
|  | 120° F. | 130° F. | 160° F. | 175° F. |
| 1 | 0 | 0 | 0 | 0 |
| 2 | 0 | 0 | 0 | 0 |
| 3 | 0 | 0 | 29 | 45 |
| 6 | 0 | 0 | 35 | 51 |
| 7 | 0 | 0 | 36 | 53 |
| 8 | 0 | 0 | 36 | 57 |
| 9 | 0 | 0 | 49 | 64 |
| 10 | 0 | 0 | 50 | 68 |
| 14 | 0 | 0 | 56 | 68 |
| 17 | 0 | 0 | 63 | 67 |
| 28 | 0 | 0 | 68 | 66 |
| 55 | 23 | 27 | 69 | 67 |
| 98 | 26 | 30 | 77 | 57 |
| 149 | 26 | 36 | 79 | 53 |
| 220 | 26 | 48 | 83 | 41 |

The data of Table III illustrates how the rate of dissociation of the chromium malonate complex affects the rate of gelation. At the lower temperatures the dissociation rate is fairly slow so gelation does not proceed until a period of time lapses. At the high temperatures, on the other hand, gelation starts sooner and progresses faster. The decline in gel strength with time at 175° F. is due to the degradation of the polymer at this temperature.

To find out the temperature limit for use of chromium malonate, a qualitative gel stability study was conducted using the same polymer as was used to generate the Table II data in SBU brine at 200° F., 250° F. and 300° F. The polymer concentration was 6300 mg/l, and the chromium concentration was 200 mg/l. The samples at 300° F. showed a shrunken gel within one day of aging. At 250° F. gelation also occurred within one day, and the gel was peeled. The gel separated and shrunk within 6 days of aging. The samples at 200° F. showed measurable gels in two days of aging. The gel strength got better with aging, got firm in 9 days of aging, and continued firm throughout the whole aging period of 217 days.

A similar study was conducted using a terpolymer of acrylamide, sodium-2-acrylamido-2-methyl-1-propane sulfonate, and N-vinyl-2-pyrrolidone, available commercially from Drilling Specialties Company, at 1% concentration. This polymer is more resistant to degradation at high temperatures than the copolymer used in the previous example. At 300° F. thickening occurred in the first day of aging, then the chromium malonate precipitated out of the solution. At 250° F., gelation started in two days and continued to improve up to 20 days of aging, then started to deteriorate thereafter. At 200° F. gelation did not occur in the first 29 days of aging; however, after 37 days of aging there was a weak gel which continued to improve to a very hard gel after 118 days of aging. The gel continued very hard during the test of the aging period of 239 days.

The data presented in Table IV below shows the gelation reaction as a function of crosslinker concentration at 175° F. and 200° F. The solution preparation procedure, concentration of polymer, polymer type, and crosslinker type were all similar to those used to generate the Table II data. The samples were aged for 13 days and 6 days at 175° F., and 200° F., respectively.

TABLE IV

Gelation Extent as a Function of Chromium (III) Concentration

| Chromium (III) (mg/l) | Gelation Extent (psi) 175° F. | Gelation Extent (psi) 200° F. |
| --- | --- | --- |
| 200 | 0.17 | 4.43 |
| 150 | 0.13 | 4.84 |
| 100 | 0.11 | 4.28 |
| 50 | 0.07 | 0.83 |
| 25 | 0.04 | 0.41 |

The above data indicates that stronger gels can be obtained by increasing the crosslinker concentration, and vice versa.

The data presented in Table V below demonstrates development of the gel as a function of crosslinker concentration when chromium oxalate complex was the gelling agent. The same polymer type and concentration were used as were used to generate the Table II data.

TABLE V

Gel Strength (%) as a Function of Chromium (III) Concentration at 175° F. and 200° F. Using Chromium Oxalate as the Crosslinking Complex

| Time (Days) | 175° F. (mg/l Cr) | | | | | 200° F. (mg/l Cr) | | |
| --- | --- | --- | --- | --- | --- | --- | --- | --- |
|  | 25 | 50 | 100 | 200 | 400 | 25 | 50 | 100 |
| 1 | 0 | 0 | 0 | 0 | 33 | 0 | 0 | 36 |
| 4 | 0 | 0 | 40 | 72 | 80 | 0 | 30 | 68 |
| 5 | 0 | 0 | 50 | 73 | 82 | 0 | 28 | 68 |
| 6 | 0 | 0 | 61 | 75 | 83 | 0 | 36 | 71 |
| 7 | 0 | 0 | 61 | 76 | 83 | 0 | 34 | 71 |
| 14 | 0 | 0 | 70 | 81 | 86 | 0 | 46 | 71 |
| 21 | 0 | 27 | 73 | 82 | 88 | 0 | 43 | 70 |
| 28 | 0 | 36 | 73 | 82 | 88 | 0 | 52 | 72 |
| 34 | 0 | 35 | 75 | 82 | 89 | 0 | 52 | 70 |
| 66 | 0 | 35 | 77 | 83 | 90 | 0 | 33 | 62 |

The above data shows that the development of the gel when chromium oxalate complex is used as the crosslinker follows the same trends as the gel made with chromium malonate complex. However, the gelation rates of the oxalate gels are faster and proceed to form stronger gels than the malonate gels.

EXAMPLE 3

14 core floods were performed to study gelation with chromium malonate. The floods were conducted in Berea cores. Each core was prepared by coating with epoxy resin and equipped with 4 pressure taps distributed along the core in addition to an injection port pressure tap. The taps were located 1, 2.5, 3.5, and 5 inches away from the injection port. This many pressure taps allow the evaluation of what is happening in each segment of the core. Prior to flooding the core with the active ingredients, it was evacuated for 2 hours, saturated with brine under vacuum, then saturated with brine under 70–100 psi of pressure. The core was then placed in a water bath, connected to the flow lines and the pressure communication lines and brine (2–6 pore volumes) flowed to measure the core permeability. The floods were conducted at 80° C. (175° F.). The same copolymer of acrylamide and sodium AMPS used for the bulk gelation study was used in 13 core floods. One flood was conducted without polymer to evaluate the transport of the chromium malonate complex in porous media. 4 pore volumes of 250 mg/l Cr(III) as the malonate complex in 5% NaCl brine were flowed in this test. The Cr(III) content in the effluent equaled the injected concentration after 2 pore volumes were flowed. A Cr(III) retention of 126 lb/acre-ft. was found in this flood.

The bulk gelation studies described above showed the gelation of this polymer with chromium malonate not to occur within the first few days of aging. Given the flow rates employed in core experiments which are around 10–14 ml/hr, the residence time of a fluid element in a 6×1″ core is 1.2–1.8 hours, Therefore, at the lowest flow rate with the test equipment (1.3 ml/hr), the residence time was too short to effectively form gels in the core if the active ingredients were flowed sequentially. Therefore, the core flood procedure was modified to accommodate this fact, as follows: a polymer solution was flowed first, followed by a pre-gel solution of polymer and crosslinker and a brine postflush. The first couple of cores were flooded with the above sequence of slugs one right after the other. The later floods were conducted similarly except the core was shut off after the pre-gel solution slug in order to give the gel time to develop. In those core floods where the core was filled with pre-gel solution and aged under static conditions, a polymer slug was flowed after aging and prior to the brine afterflush.

The initial core permeabilities to brine were determined using Darcy's equation $[(K/U)=(Q/\Delta P)\cdot(L/A)]$ from the flow rate, Q, and the corresponding pressure drop, $\Delta P$, data. Where K is the permeability, U is the viscosity of the flowed fluid, L is the length of the porous medium, and A is the cross-sectional area of the core. The term K/U is called the mobility of the fluid under consideration. The resistance factor is defined as the ratio of the brine mobility to the polymer solution mobility. Since the core dimensions are constant in a given experiment, the ratio of $Q/\Delta P$ while flowing the brine to $Q/\Delta P$ while flowing the polymer solution is used to calculate the resistance factor. The resistance factor is an indication of the reduction in mobility, or the acceptance of the porous medium of the flowing fluid. The residual resistance factor (RRF) is defined as the ratio of mobility to water or brine before the treatment to the mobility to water or brine after the treatment. The RRF value indicates the extent of the lasting brine mobility reduction through the core after the treatment.

Two of the floods were carried out without the crosslinker. This was done to have blank runs which would help in evaluating the impact of the crosslinker on the residual resistance factors obtained in the floods with the whole process. The data presented in Table VI below shows the average core permeabilities, volumes and concentrations of the active ingredient slugs, and the static aging period of the core floods with the polymer. The data presented in Table VII below shows the residual resistance factors obtained in the various regions of the core. As these results clearly demonstrate, the chromium malonate crosslinked the polymer and reduced the core permeability by more than 10 times the reduction of permeability obtained in the blank polymer floods. The residual resistance factors obtained in the first inch of the cores were strongly influenced by the residence time of the pre-gel solution at 175° F. before it entered the core. A residence time of about 5 hours was found to be necessary for the gel to form, regardless of the flow rate. The residence time was calculated as the time elapsed from the time the vessel containing the pre-gel solution was placed in the 175° F. bath to the time when the pressure reading of the entrance pressure tap started to rise rapidly with flow. This rough calculation of residence time gives us a gelation rate which appears to be much faster than the bulk gelation rate. This discrepancy in gelation rate is really a manifestation of the methods of measuring gelation. In the porous medium we are measuring the development of small gel nuclei; whereas, the bulk gelation measurements reflect the development of larger gel structures, their adhesion to the walls of the container, and their cohesion together.

TABLE VI

Average Core Permeability, Volumes and Concentrations of Injected Chemicals

| Core No. | Ave. Perm. (md) | Polymer Slug conc. (mg/l) | Polymer Slug Volume (PV) | Cr + 3 (mg/l) | Volume (PV) | Aging (hr) |
|---|---|---|---|---|---|---|
| 1 | 320.1 | 2000 | 4.05 | None | | None |
| 2 | 389.2 | 2000 | 5.05 | None | | 187 |
| 3 | 409.3 | 3000 | 4.50 | 200 | 3.03 | None |
| 4 | 341.6 | 3000 | 6.28 | 50 | 2.80 | None |
| 5 | 378.9 | 3000 | 6.17 | 25 | 2.38 | None |
| 6 | 345.8 | 1000 | 7.65 | 25 | 4.68 | None |
| 7 | 432.8 | 1000 | 2.00 | 25 | 5.02 | None |
| 8 | 392.0 | 1000 | 10.00 | 25 | 11.78 | 16 |
| 9 | 401.4 | 1000 | 5.40 | 75 | 3.30 | 24 |
| 10 | 355.5 | 1000 | 5.40 | 75 | 3.10 | 20 |
| 11 | 390.3 | 1000 | 6.06 | 75 | 2.58 | 140 |
| 12 | 333.9 | 2000 | 3.08 | 75 | 1.50 | 211 |
| 13 | 397.9 | 2000 | 2.41 | 100 | 1.4 | 185 |

TABLE VII

Permeabilities, Resistance Factors (RF) and Residual Resistance Factors (RRF) in the Five Regions of the Core

| Core No. | Property | 1,2 | 2,3 | 3,4 | 4,5 | 5,E |
|---|---|---|---|---|---|---|
| 1 | perm(md) | 322.6 | 354.2 | 282.7 | 318.2 | 322.6 |
|  | RF | 13.18 | 13.11 | 11.44 | 11.94 | 10.48 |
|  | RRF | 1.56 | 3.61 | 3.78 | 4.16 | 3.77 |
| 2 | perm(md) | 338.1 | 547.2 | 286.3 | 470.6 | 303.8 |
|  | RF | 10.21 | 14.05 | 8.05 | 12.41 | 10.12 |
|  | RRF | 1.44 | 3.75 | 2.55 | 3.13 | 3.01 |
| 3 | perm(md) | 304.2 | 459.0 | 563.6 | 385.5 | 334.1 |
|  | RF | 35.33 | 24.00 | 24.52 | 18.48 | 14.24 |
|  | RRF | 50.31 | 446.36 | 521.03 | 363.11 | 197.82 |
| 4 | perm(md) | 309.5 | 361.3 | 348.9 | 441.2 | 246.9 |
|  | RF | 25.40 | 15.66 | 17.47 | 21.33 | 13.68 |
|  | RRF | 276.42 | 851.14 | 305.57 | 87.06 | 45.05 |
| 5 | Plugged while flowing the mixed slug. | | | | | |
| 6 | perm(md) | 157.5 | 464.2 | 319.6 | 510.0 | 277.9 |
|  | RF | 7.98 | 10.00 | 7.23 | 8.79 | 7.18 |
|  | RRF | 4.85 | 169.62 | 57.14 | 37.61 | 28.82 |
| 7 | perm(md) | 420.7 | 544.1 | 420.7 | 504.0 | 274.4 |
|  | RF | 14.92 | 12.47 | 8.86 | 11.92 | 12.47 |
|  | RRF | 114.88 | 51.63 | 30.87 | 23.97 | 16.92 |
| 8 | Plugged while flowing the mixed slug. | | | | | |
| 9 | perm(md) | 461.2 | 335.5 | 346.8 | 353.7 | 509.9 |
|  | RF | 1.80 | 3.92 | 3.71 | 3.44 | 4.96 |
|  | RRF | 1.46 | 49.80 | 119.75 | 58.72 | 31.34 |
| 10 | perm(md) | 268.5 | 319.7 | 439.4 | 333.6 | 344.5 |
|  | RF | 6.45 | 3.54 | 6.42 | 2.55 | 4.67 |
|  | RRF | 153.19 | 700.03 | 57.05 | 14.78 | 9.47 |
| 11 | perm(md) | 315.9 | 344.9 | 524.1 | 315.2 | 451.3 |
|  | RF | 3.33 | 4.74 | 4.98 | 4.05 | 4.77 |
|  | RRF | 8.31 | 299.22 | 58.57 | 14.96 | 7.49 |
| 12 | perm(md) | 297.0 | 359.9 | 297.0 | 392.7 | 322.9 |
|  | RF | 9.69 | 10.08 | 11.25 | 11.00 | 10.54 |
|  | RRF | 8.26 | 16.15 | 24.77 | 22.92 | 9.67 |
| 13 | perm(md) | 453.2 | 365.3 | 429.9 | 400.3 | 340.7 |
|  | RF | 8.55 | 9.19 | 7.70 | 8.19 | 8.22 |
|  | RRF | 3.04 | 10.63 | 15.71 | 13.73 | 8.14 |

What is claimed is:

1. A method of altering the permeability of a subterranean formation having a temperature in the range of from about 160° F. to about 210° F., a portion of said subterranean formation being located a long distance from a surface injection point, comprising injecting a composition into said formation which forms a gel therein, said composition being comprised of:
   (a) water;
   (b) at least one polymer capable of being gelled when contacted with a crosslinking agent;
   (c) at least one crosslinking agent comprised of polyvalent metal cation; and
   (d) a cation reactivity retarding chelating agent which provides anions for chelating said polyvalent metal cation selected from the group consisting of substantially water soluble dicarboxylic acids containing from 2 to 4 carbon atoms, substantially water soluble di- and polycarboxylic acids containing from 3 to 6 carbon atoms in which a hydrogen atom of the alpha or beta carbon atom is replaced by a hydroxyl group, substantially water soluble alpha and beta ketocarboxylic acids containing from 2 to 4 carbon atoms, the corresponding water soluble salts of said acids, and mixtures of said acids and salts.

2. The method of claim 1 wherein said crosslinking polyvalent metal cation is selected from the group consisting of aluminum, zirconium (IV), the metal cations of the first transition metal series, and mixtures of such cations.

3. The method of claim 2 wherein said polymer is selected from the group consisting of homopolymers of acrylamide, copolymers of acrylamide and vinyl pyrrolidone, homopolymers of methacrylamide, copolymers of acrylamide and methacrylamide, copolymers of acrylamide and acrylic acid, copolymers of methacrylamide and acrylic acid, terpolymers of pyrrolidone, acrylamide and sodium 2-acrylamido-2-methylpropane sulfonate, and copolymers of acrylamide and sodium 2-acrylamido-2-methylpropane sulfonate.

4. The method of claim 3 wherein said chelating agent is malonic acid or a corresponding water soluble salt thereof.

5. The method of claim 4 wherein said polyvalent metal cation is chromium (III) cation.

6. The method of claim 3 wherein said chelating agent is oxalic acid or a corresponding water soluble salt thereof.

7. The method of claim 6 wherein said polyvalent metal cation is chromium (III) cation.

8. The method of claim 1 wherein said water is a hard brine.

9. The method of claim 1 wherein a volume of said composition in a range of from about 100% to about 120% of the pore volume of said formation is injected into said formation.

10. A method of altering the permeability of a subterranean formation subjected to waterflooding to improve the watersweep efficiency therein, said subterranean formation having a temperature in the range of from about 160° F. to about 210° F. and a portion of said subterranean formation being located a long distance from a surface injection point, comprising injecting in sequence:

(a) an aqueous solution or dispersion of at least one polymer capable of being gelled when contacted with a crosslinking agent;

(b) an aqueous solution of crosslinking polyvalent metal cation chelated with anion provided by a chelating agent selected from the group consisting of substantially water soluble dicarboxylic acids containing from 2 to 4 carbon atoms, substantially water soluble di- and polycarboxylic acids containing from 3 to 6 carbon atoms in which a hydrogen atom of the alpha or beta carbon atom is replaced by a hydroxyl group, substantially water soluble alpha and beta ketocarboxylic acids containing from 2 to 4 carbon atoms, the corresponding water soluble salts of said acids, and mixtures of said acids and salts; and (c) an aqueous solution or dispersion of at least one polymer capable of being gelled when contacted with a crosslinking agent.

11. The method of claim 10 wherein said crosslinking polyvalent metal cation is selected from the group consisting of aluminum, zirconium (IV), the metal cations of the first transition metal series, and mixtures of such cations.

12. The method of claim 11 wherein said polymer is selected from the group consisting of homopolymers of acrylamide, copolymers of acrylamide and vinyl pyrrolidone, homopolymers of methacrylamide, copolymers of acrylamide and methacrylamide, copolymers of acrylamide and acrylic acid, copolymers of methacrylamide and acrylic acid, terpolymers of pyrrolidone, acrylamide and sodium 2-acrylamido-2-methylpropane sulfonate, and copolymers of acrylamide and sodium 2-acrylamido-2-methylpropane sulfonate.

13. The method of claim 12 wherein said chelating agent is malonic acid or corresponding water soluble salts thereof.

14. The method of claim 13 wherein said polyvalent metal cations are chromium (III) cations.

15. The method of claim 12 wherein said chelating agent is oxalic acid or corresponding water soluble salts thereof.

16. The method of claim 15 wherein said polyvalent metal cation is chromium (III) cation.

17. The method of claim 10 wherein said aqueous polymer solutions or dispersions and said aqueous chelated crosslinking polyvalent metal cation solution are formed using a hard brine.

18. The method of claim 10 wherein a combined volume of said aqueous polymer solutions or dispersions and said aqueous chelated crosslinking polyvalent metal cation solution in a range of from about 100% to about 120% of the pore volume of said formation is injected into said formation.

* * * * *